United States Patent [19]
Zangenfeind

[11] 3,921,878
[45] Nov. 25, 1975

[54] APPARATUS FOR REMOVING EXPOSED FILMS AND BACKING STRIPS FROM CASSETTES

[75] Inventor: Helmut Zangenfeind, Puchheim, Germany

[73] Assignee: Agfa-Gevaert Aktengesellschaft, Leverkusen, Germany

[22] Filed: Sept. 21, 1973

[21] Appl. No.: 399,506

[30] Foreign Application Priority Data
Sept. 22, 1972  Germany............................ 2246671

[52] U.S. Cl.................................. 226/91; 226/109
[51] Int. Cl.².......................................... G03B 1/56
[58] Field of Search .................. 226/91, 92, 5, 109; 156/584; 242/197; 179/100.2 T, 100.2 ZA

[56] References Cited
UNITED STATES PATENTS
3,373,951   3/1968   Mazoyer.................... 179/100.2 ZA
3,780,922   12/1973  Bloemendaal....................... 226/92

Primary Examiner—Richard A. Schacher
Attorney, Agent, or Firm—Michael S. Striker

[57] ABSTRACT

Apparatus for removing backing strips and exposed films from drop-in cassettes wherein the window for the foremost unexposed film frame is located in front of an opening for observation of symbols on the backing strip has a pusher which is movable through the opening to expel the leader of the backing strip through the window and into the nip of two first advancing rollers which introduce the leader into a first channel for entry into a collecting receptacle. The leader of exposed film is stripped off the backing strip by a deflector and enters a second channel to advance into the nip of two second advancing rollers and to be transported to a splicing station for connection to the trailing end of the preceding film. The pusher can enter a circumferential groove of one first advancing roll and the other first advancing roll has a shallower groove for a finger which directs the leader of the backing strip into the first channel.

12 Claims, 3 Drawing Figures

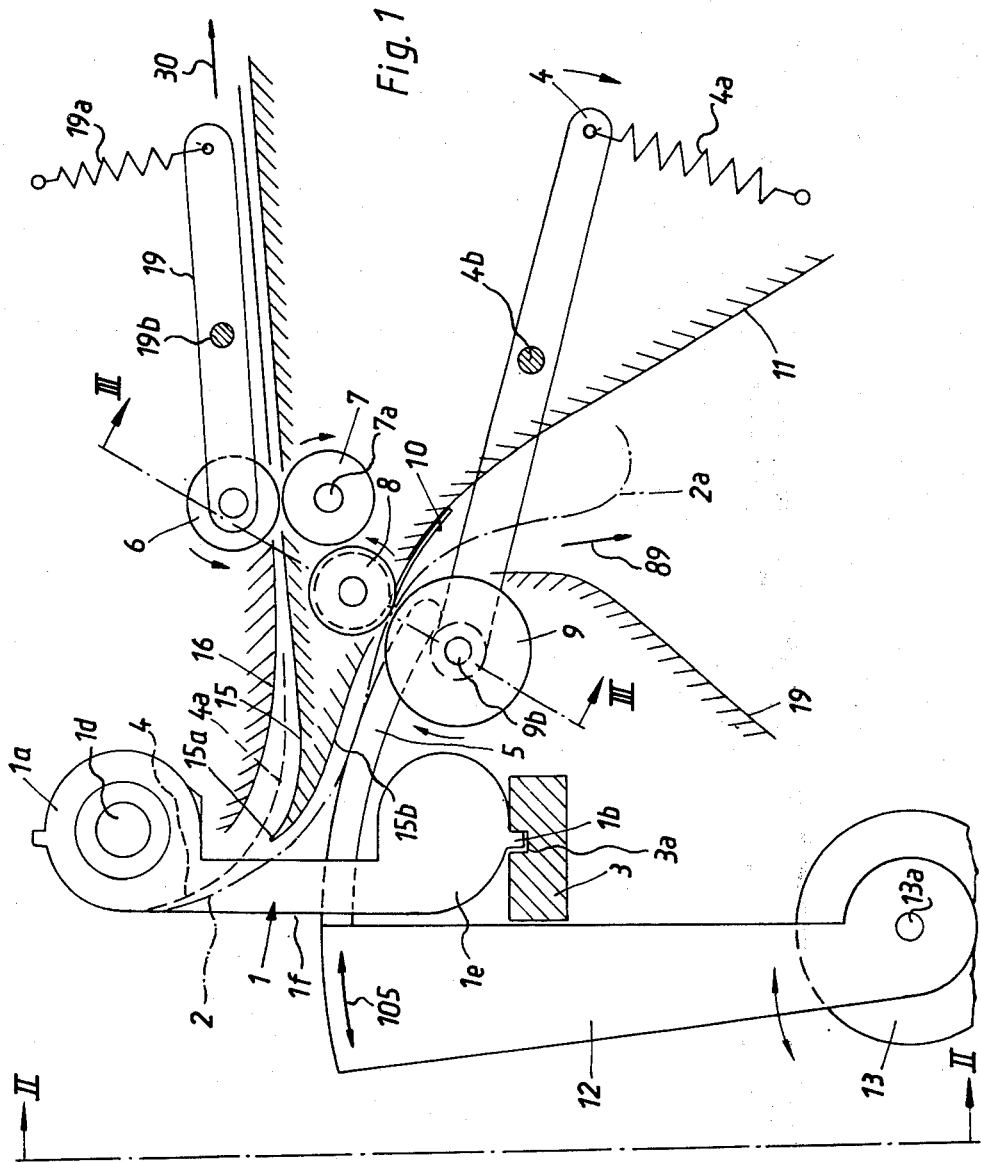

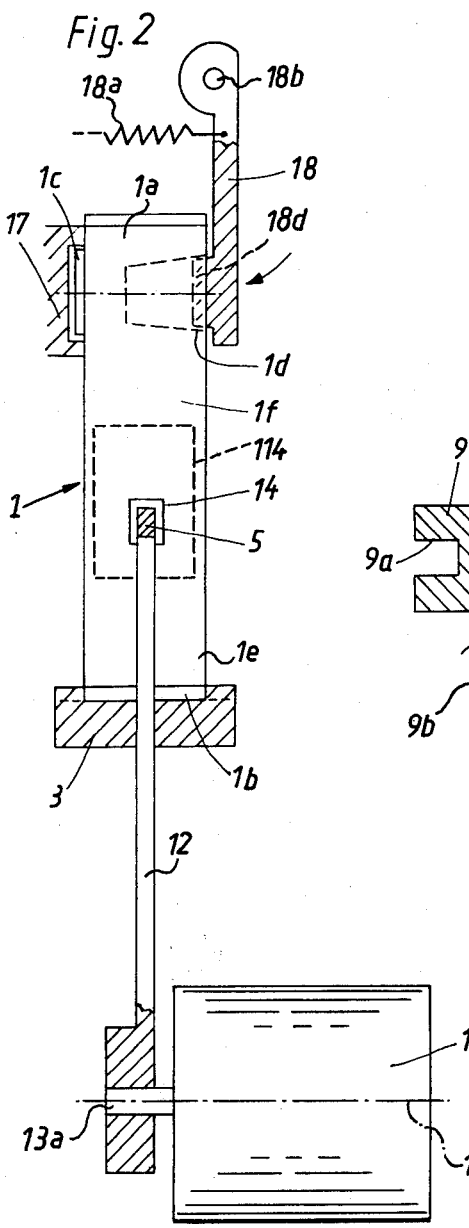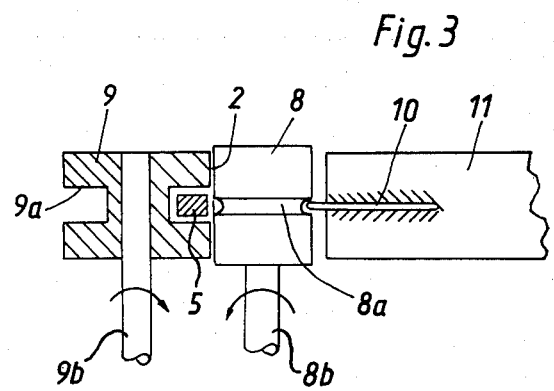

APPARATUS FOR REMOVING EXPOSED FILMS AND BACKING STRIPS FROM CASSETTES

BACKGROUND OF THE INVENTION

The present invention relates to apparatus for removing backing strips and exposed films from containers, especially from containers of the type known as drop-in cassettes which are used in many still cameras and wherein a hollow intermediate section of the casing of the container is provided with a front opening or window which registers with the foremost unexposed film frame when the container is properly located in a still camera, and with a rear opening or window to permit observation of numerals on the backing strip. Such numerals indicate the number of exposed or unexposed film frames in the container. The rear opening is smaller than and registers with the front opening.

It is already known to expel the leader of the backing stip from the container for exposed film by resorting to a device which is caused to pass through the rear opening so as to expel the leader of the backing strip through the front opening of the intermediate section of the container. In accordance with the presently prevailing practice, the expulsion of backing strip from the container is performed by hand in a dark room. This is a tedious operation which consumes much time, especially since the workman cannot fully observe the removal of backing strip and/or exposed film.

SUMMARY OF THE INVENTION

An object of the invention is to provide an automatic or semiautomatic apparatus for removal or expulsion of backing strips and exposed films from containers of the type wherein the leader of the backing strip in a cassette containing fully exposed roll film is located between a front opening and a rear opening so that it can be expelled through one of the openings by means of a tool which is introduced through the other opening.

Another object of the invention is to provide an apparatus which can remove and advance exposed films in such a way that the removed film need not be touched by an attendant on its way from the interior of a container to a further processing station, for example, to a splicing station where its leader is connected to the trailing end of a preceding exposed film.

A further object of the invention is to provide the apparatus with novel means for intercepting, advancing and guiding the leaders of backing strips and exposed films subsequent to their expulsion from drop-in cassettes or analogous containers.

An additional object of the invention is to provide the apparatus with novel means for automatically segregating the leader of the exposed film from the leader of the backing strip during and/or in response to expulsion of such leaders from a container for exposed but undeveloped roll film.

A further object of the invention is to provide an apparatus which can remove large numbers of exposed films per unit of time and whose operation can be synchronized with the operation of a developing machine in a photographic processing laboratory or the like to insure automatic, economical and gentle processing of exposed films for the purpose of development and/or of making diapositives or prints.

The improved apparatus can be used to remove films and backing strips from cassettes or analogous containers of the type wherein the casing or housing of the container is provided with registering first and second openings and at least the leader of the convoluted backing strip is located between the two openings when the film is fully exposed and is ready for development. The apparatus comprises an expelling device in the form of a pusher which is movable forwardly and backwards along a predetermined path, locating means which is arranged to support the casing of a container in such position that the openings of the casing are located in the path of movement of the pusher while the pusher moves forwardly whereby the pusher (during forward movement thereof) passes first through one and thereupon through the other opening of the casing which is supported by the locating means and the pusher expels the leader of the backing strip through the other opening, and advancing means located behind the other opening of the casing which is supported by the locating means and serving to engage and advance the expelled leader of the backing strip lengthwise whereby the advancing means draws the exposed film from the casing throough the intermediary of the backing strip.

The apparatus preferably further comprises guide means defining a channel for the leader of the backing strip and having an inlet located behind the advancing means, as considered in the direction of lengthwise movement of the backing strip, to guide the leader into a collecting receptacle or the like. Once the leader of the backing strip moves into the range of and is transported lengthwise by the advancing means, the backing strip is tensioned between the advancing means and the other opening of the casing which is supported by the locating means whereby the backing strip bears against a deflector which directs the oncoming leader of the exposed film into a second guide means for transport toward a splicing station or to another destination.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a partly side elevational and partly vertical sectional view of an apparatus which embodies the invention;

FIG. 2 is an end elevational view as seen in the direction of arrows from the line II-II of FIG. 1; and FIG. 3 is a sectional view as seen in the direction of arrows from the line III-III of FIG. 1.

DESCRIPTION OF THE PREFERRED EMBODIMENTS

Referring first to FIGS. 1 and 2, there is shown an apparatus for removing exposed films 4 and backing strips 2 made of paper or the like from containers or cassettes 1 wherein a substantially cylindrical first section 1a of a synthetic plastic or metallic casing contains a takeup reel (not shown) for convoluted exposed film and backing strip, a similar second section 1e of the casing contains a supply reel (not shown) which stores the backing strip and unexposed film, and a flat hollow intermediate section 1f is provided with a front opening or window 114 and a smaller rear opening or window 14. When the casing of the container 1 is properly installed in the body of a photographic apparatus, e.g., in a still camera, not shown, the opening 114 faces the picture taking lens and registers with the foremost unexposed frame of the film 4 when the user of the photographic apparatus has completed the actuation of film transporting mechanism and the apparatus is ready to make an exposure. The rear opening 14 is in register with a row of symbols (not shown) on the backing strip 2, and such symbols are normally in the form of numerals which indicate the number of exposed or unexposed film frames. The opening 14 of a casing which is properly inserted into a photographic apparatus is in register with an opening in the body (e.g. in the movable door) of the photographic apparatus so that the user can readily determine the number of exposed or unexposed film frames. Containers of the type corresponding to the container 1 of FIGS. 1 and 2 are available on the market and are known as drop-in cassettes.

When the last frame of film 4 in the casing of the container 1 shown in FIGS. 1 and 2 is exposed, the leader 4a of the film 4 and/or the leader 2a of the backing strip 2 is located in the intermediate section 1f between the openings 14 and 114. Thus, the leader 2a of the backing strip 2 is then adjacent to the rear opening 14.

The improved apparatus comprises composite locating means for supporting the casing of a container 1 in a predetermined position which is shown in FIGS. 1 and 2. The locating means comprises a fixed support 3 having a recess or groove 3a which can receive a projection or rib 1b on the section 1e of a properly positioned container 1. Furthermore, the locating means comprises a lever 18 which is biased clockwise, as viewed in FIG. 2, by a spring 18a and is pivotable at 18b. A projection 18d of the lever 18 extends into a recess 1d in the section 1a of a properly positioned container 1 when the projection 1b of the section 1e extends into the recess 3a of the support 3. The recess 1d may serve the additional function of enabling the customary coupling element of the film transporting mechanism in a camera to reach and rotate the takeup reel in the section 1a when the film transporting mechanism is being actuated to advance the film 4 by the length of a frame. A third part of the locating means includes a stationary socket 17 which can receive a projection 1c of the section 1a when the projection 1b extends into the recess 3a. A container 1 is properly oriented and supported by the locating means 3, 17, 18 when its projections 1b, 1c respectively extend into the recess 3a and socket 17 and when the projection 18d of the spring-biased lever 18 extends into the recess 1d. It will be noted that the section 1a of a properly supported casing is located at the upper end of the container 1.

The container 1 can be installed in the locating means 3, 17, 18 by hand or by an automatic inserting mechanism which is not shown in the drawing. Reference may be had to the commonly owned copending application Ser. No. 399,181 of Klose, now U.S. Pat. No. 3,866,744.

The apparatus further comprises an arcuate pusher or expelling means 5 which is movable forwardly and rearwardly in directions indicated by a double-headed arrow 105. The pusher 5 is mounted at the outer end of a lever 12 on the armature 13a of a rotary electromagnet 13 which constitutes a drive means for moving the pusher along an arcuate path whereby the pusher moves forwardly while the lever 12 pivots clockwise, as viewed in FIG. 1. The center of curvature of the pusher 5 (and of the path along which the pusher moves) is located on the axis 13b of the armature 13a.

When the locating means 3, 17, 18 supports a container 1, the openings 14 and 114 of the intermediate section 1f are located in the path of movement of the pusher 5. When the pusher 5 moves forwardly, it enters the intermediate section 1f through the opening 14 and leaves the section 1f through the opening 114 whereby the leader 4a of the film 4 and/or the leader 2a of the backing strip 2 is expelled through the opening 114. As shown in FIG. 1, the cross-sectional area of the pusher 5 is selected in such a way that the pusher can enter the opening 14 with sufficient clearance even if the dimensions of the opening 14 deviate from standard dimensions.

The advancing means for the expelled leader 2a of the backing strip 2 comprises two rotary advancing members on rollers 8, 9 which are located at the opposite sides of the path of movement of the pusher 5. The roller 8 is driven by a drive means including a fixedly mounted shaft 8b (see particularly FIG. 3) so that it rotates counterclockwise, as viewed in FIG. 1. The roller 9 is biased toward the roller 8 and need not be positively driven. As shown in FIG. 1, the shaft 9b for the roller 9 is mounted on one arm of a two-armed lever 4 which is fulcrumed at 4b and is biased clockwise by a helical spring 4a so that the roller 9 tends to bear against the roller 8. FIG. 3 shows that the roller 9 is formed with a circumferential groove 9a which is deep and wide enough to receive the tip of the pusher 5 when the latter reaches the end of its forward stroke. The lever 12 for the pusher 5 then abuts against the stationary support 3 (see FIG. 1) or against other suitable stop means. The entry of the tip of pusher 5 into the groove 9a of the roller 9 insures that the leader 2a of the backing strip 2 is introduced into the nip of the rollers 8 and 9 so that the rollers entrain the leader 2a and advance it lengthwise as indicated by the arrow 89. The leader 2a tends to curl upwardly, as viewed in FIG. 1, whereby its leading edge may slide along the adjacent surface of a plate 11 made of sheet metal or the like and forming part of a guide means which further includes a second sheet metal plate 19. The guide means including the plates 11, 19 defines a channel whose width increases in a direction away from the nip of the rollers 8, 9 and the inlet of the guide means 11, 19 is located immediately behind the rollers 8, 9, as considered in the direction of arrow 89.

The roller 8 of the advancing means for the backing strip 2 is also provided with a circumferential groove 8a (see FIG. 3) which can receive a preferably elastic or partially elastic projection or stripping finger 10 provided on or forming part of the plate 11. The tip of the projection 10 extends into the groove 8a in the region of the nip of the rollers 8, 9 and behind the rollers, as considered in the direction of arrow 89, so as to insure that the leader 2a of the backing strip 2 is compelled to enter the inlet of the channel which is defined by the guide means 11, 19. The outlet of the guide means 11, 19 is located above a collecting receptacle (not shown) which receives the backing strip 2 when its evacuation from the casing of the container 1 is completed.

The apparatus further comprises second guide means including two walls 15, 16 which define an elongated channel for the leader 4a of the film 4. The inlet of the channel which is defined by the guide means 15, 16 is adjacent to the opening 114 of the container 1 in the locating means 3, 17, 18, and the width of this channel decreases in the direction indicated by an arrow 30, namely, toward the nip of two additional advancing rollers 6, 7. The wall 15 of the guide means for the film 4 has a pointed front end portion 15a which constitutes a deflector for the leaders 2a, 4a and extends between these leaders when the pusher 5 performs a forward stroke to expel the leaders through the opening 114. The wall 15 is further provided with an elongated and preferably slightly curved guide surface 15b which extends from the deflector 15a and all the way to the nip of the advancing rollers 9, 10 for the backing strip 2. The surface 15a insures that the leader 2a enters the nip of the rollers 8, 9 and that it is thereupon deflected by the projection 10 in order to enter the channel which is defined by the guide means 11, 19. The deflector 15a is located above the path of forward movement of the pusher 5. The leader 4a of the film 4 exhibits a tendency to curl away from the adjacent portion of the backing strip 2 (see FIG. 1), and the inlet of the channel which is defined by the guide means 15, 16 is positioned in such a way that the upwardly curling leader 4a automatically enters this channel and slides along the internal surface of the wall 16 to advance toward and to enter the nip of the advancing rollers 6, 7 in response to lengthwise movement of the leader 2a under the action of the rollers 8, 9. Thus, the leader 2a can pull the leader 4a into and through the guide means 15, 16. As a rule, the leader 2a extends forwardly and beyond the leader 4a.

The shaft 7a of the roller 7 is rotatable about a fixed axis and forms part of a drive means which further includes the shaft 8b and serves to rotate the roller 7 in synchronism with the roller 8, i.e., in such a way that the peripheral speed of the roller 7 (and hence the speed of lengthwise movement of the film 4) equals the peripheral speed of the roller 8 (and hence the speed of lengthwise movement of the backing strip 2). The roller 6 is mounted on one arm of a lever 19 which is biased counterclockwise by a helical spring 19a and is fulcrumed at 19b. The purpose of the lever 19 and spring 19a is to bias the roller 6 toward the roller 7.

The leader 4a of the film 4 advances beyond the nip of the rollers 6, 7 and enters a suitable splicing station (not shown) where it is attached to the trailing end of the preceding film 4. The thus spliced-together films 4 form an elongated web which is convoluted onto the core of a reel and is introduced into a developing apparatus, not shown. The mechanism at the splicing station is preferably designed to automatically attach the leader of the next-following film to the trailing end of the preceding film. Such splicing mechanisms are well known from the art of treating exposed roll films in a processing laboratory.

The operation:

A loaded container 1 is mounted in the locating means 3, 17, 18 in a manner as shown in FIGS. 1 and 2 so that the opening 114 faces the deflector 15a and the opening 14 faces the tip of the pusher 5 which is assumed to dwell in its retracted position. Thus, the opening 14 is located ahead of the opening 114, as considered in the direction of forward movement of the pusher 5, and the leader 2a of the backing paper 2 in the container 1 is assumed to be located in the intermediate section 1f between the openings 14, 114 adjacent to the opening 14 and in front of the leader 4a of the convoluted and fully exposed film 4.

The pusher 5 can be caused to move forwardly in response to completed mounting of the container 1 in the locating means 3, 17, 18, for example, in response to a signal which is produced by a detector (not shown) serving to scan the position of the lever 18. It is also possible to employ an automatic control circuit which energizes the electromagnet 13 with a predetermined delay following the anticipated completion of insertion of the container 1 into the locating means. The tip of the pusher 5 enters the section 1f by passing through the opening 14 and thereby expels the leaders 2a, 4a through the opening 114. If the front end of the leader 2a is still connected to the reel in the section 1e of the container casing, the pusher 5 folds the leader 2a over itself but is still capable of introducing the doubled-over leader 2a into the nip of the rollers 8, 9. This is due to the fact that the tip of the pusher 5 can extend into the circumferential groove 9a of the roller 9 (see FIG. 1). The roller 8 is driven by the shaft 8b in synchronism with the roller 7 (which is driven by the shaft 7a) so that the leader 2a is immediately entrained and is caused by the projection 10 to enter the inlet of the channel between the plates of the guide means 11, 19. Another advantage of the groove 9a and an advantage of the spring-biased lever 4 is that the roller 9 can yield if the tip of the pusher 5 introduces two layers of the backing strip 2 into the nip of the rollers 8, 9. As a rule, the roller 9 need not move away from the roller 8 or is deflected only negligibly when the tip of the pusher 5 enters the groove 9a.

When the rollers 8, 9 begin to advance the backing strip 2 in a direction indicated by the arrow 89, the backing strip is tensioned in the region between the upper end of the window or opening 114 and the nip of the rollers 8, 9 so that it bears against the deflector 15a. This automatically compels the leader 4a of the film 4 to enter the inlet of the channel which is defined by the guide means 15, 16. As mentioned before, the entry of leader 4a into the channel of the guide means 15, 16 is further facilitated by the tendency of the leader 4a to curl upwardly and away from the leader 2a. If the film 4 is much shorter than the backing strip 2 so that the leader 4a is still located in the section 1a while the leader 2a is located between the openings 14, 114, the backing strip 2 causes the leader 4a to move from the section 1a and to advance toward the deflector 15a which compels the leader 4 a to enter the channel of the guide means 15, 16 and to advance toward the nip of the rollers 6, 7 in response to lengthwise transport of the backing strip 2 by the rollers 8, 9. The leader 4a can be readily expelled and moved toward the rollers 6, 7 even if it is not attached to the backing strip 2. The film 4 is invariably drawn from the section 1a at the exact speed of the backing strip 2 as soon as the leader 4a is engaged and entrained by the rollers 6, 7. This is due to the aforementioned synchronization of operation of the drive means for the rollers 7 and 8.

The trailing end of the film 4 in the section 1a of the container 1 is normally glued or otherwise separably secured to the backing strip 2. Such connection is terminated by the deflector 15a in a fully automatic way as soon as the deflector is reached by the trailing end of the film 4. The rollers 8, 9 continue to rotate and extract the trailing end of the backing strip 2 from the container 1. The trailing end moves toward and beyond the nip of the rollers 8, 9 and drops by gravity into the aforementioned receptacle below the guide means 11, 19. In the next step, the empty casing of the container 1a is removed or automatically expelled from the locating means 3, 17, 18 to provide room for insertion of a loaded container.

The leader 4a of the film 4 is advanced by rollers 6, 7 (arrow 30) and reaches the aforementioned splicing station where it is automatically attached to the trailing end of the preceding film. The splicing station may be provided with detector means which automatically arrests the drive means for the roller 7 as soon as the leader 4a reaches the splicing station.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by letters Patent is set forth in the appended claims:

1. Apparatus for removing films and backing strips from containers of the type wherein a casing of the container is provided with registering first and second openings and at least the leader of convoluted backing strip is located between the openings, comprising a pusher movable forwardly and backwards along a predetermined path; locating means arranged to support the casing of a container in such position that the openings of the casing are located in said path whereby said pusher passes, during the forward movement thereof, first through one and thereupon through the other opening of the casing which is supported by said locating means and expels the leader of the backing strip through the other opening; advancing means located behind the other opening of the casing which is supported by said locating means and arranged to automatically engage the expelled leader of the backing strip and to advance the thus engaged backing strip lengthwise to thereby draw the film from the casing through the intermediary of the backing strip, said advancing means comprising first and second rotary members located at the opposite sides of said path, one of said rotary members having a peripheral groove which receives a portion of said pusher during forward movement of said pusher; and guide means defining a channel for the leader of the backing strip, said guide means having an inlet located behind said rotary members as considered in the direction of lengthwise movement of the backing strip.

2. Apparatus for removing films and backing strips from containers of the type wherein a casing of the container is provided with registering first and second openings and at least the leader of convoluted backing strip is located between said openings, comprising a pusher movable forwardly and backwards along a predetermined path; locating means arranged to support the casing of a container in such position that the openings of the casing are located in said path whereby said pusher passes, during the forward movement thereof, first through one and thereupon through the other opening of the casing which is supported by said locating means and expels the leader of the backing strip through the other opening; advancing means located behind the other opening of the casing which is supported by said locating means and arranged to engage and advance the expelled leader of the backing strip lengthwise and to thereby draw the film from the casing through the intermediary of the backing strip, said advancing means comprising first and second rotary members located at the opposite sides of said path and means for biasing one of said rotary members against the other of said rotary members; first guide means defining a channel for the leader of the film, said first guide means having an inlet adjacent to the other opening of the casing which is supported by said locating means and said first guide means comprising deflector means cooperating with the casing which is supported by said locating means to urge successive increments of the backing strip against said deflector means while the backing strip is being moved lengthwise whereby said deflector means automatically introduces the leader of the film into said channel as soon as the leader of the film reaches said deflector means; and second guide means extending from said deflector means substantially to said advancing means to guide the leader of the backing strip into the nip of said rotary members during expulsion of the leader of the backing strip by said pusher.

3. Apparatus as defined in claim 2 for removing films and backing strips from containers of the type wherein the leader of the film tends to curl in a direction away from the backing strip, said inlet of said first guide means having wall means for intercepting the curling leader of the film as soon as the leader of the film is expelled from the casing through said other opening.

4. Apparatus as defined in claim 3, wherein one of said rotary members is rotatable about a fixed axis and has a circumferential groove, said second guide means having a projection extending into said groove and arranged to direct the leader of the backing strip into said inlet.

5. Apparatus as defined in claim 4, wherein said projection is elastic.

6. Apparatus as defined in claim 3, further comprising advancing means for moving the film in said second channel lengthwise.

7. Apparatus as defined in claim 6, wherein said second advancing means comprises at least one rotary member and further comprising means for driving said one rotary member and one rotary member of said first mentioned advancing means at identical peripheral speeds so that the speed of lengthwise movement of the backing strip in said first guide means equals the speed of lengthwise movement of the film in said second guide means.

8. Apparatus as defined in claim 2, wherein one of said rotary members has a peripheral groove which receives a portion of said pusher during forward movement of said pusher.

9. Apparatus as defined in claim 2, wherein said path is an arcuate path and further comprising drive means for said pusher.

10. Apparatus as defined in claim 2, wherein said locating means comprises a plurality of discrete parts at least one of which is biased against the casing of a container which is supported by said locating means.

11. Apparatus as defined in claim 2 for removing films and backing strips from containers wherein the casing has a first section for storage of convoluted exposed film and a second section for storage of convoluted unexposed film and the first and second openings are located between the first and second sections, wherein said pusher is pivotable about an axis which is nearer to the second section than to the first section of a casing which is supported by said locating means so that said predetermined path has a convex side facing the first section of the casing.

12. Apparatus as defined in claim 2, wherein said second guide means has a guide surface along which the expelled leader of the backing strip advances toward the nip of said rotary members under the action of said pusher.

* * * * *